Oct. 18, 1949.  E. BUGATTI  2,485,034
PRESELECTING MECHANISM FOR GEAR BOXES
Filed Dec. 27, 1945  6 Sheets-Sheet 1

Oct. 18, 1949.  E. BUGATTI  2,485,034
PRESELECTING MECHANISM FOR GEAR BOXES
Filed Dec. 27, 1945  6 Sheets-Sheet 3

Inventor: Ettore Bugatti
By Mauro & Lewis
Attorneys

Oct. 18, 1949.  E. BUGATTI  2,485,034
PRESELECTING MECHANISM FOR GEAR BOXES
Filed Dec. 27, 1945  6 Sheets-Sheet 4

Inventor: Ettore Bugatti
By Mauro & Lewis
Attorneys

Oct. 18, 1949. E. BUGATTI 2,485,034
PRESELECTING MECHANISM FOR GEAR BOXES
Filed Dec. 27, 1945 6 Sheets-Sheet 5

Inventor: Ettore Bugatti
By Mauro & Lewis
Attorneys

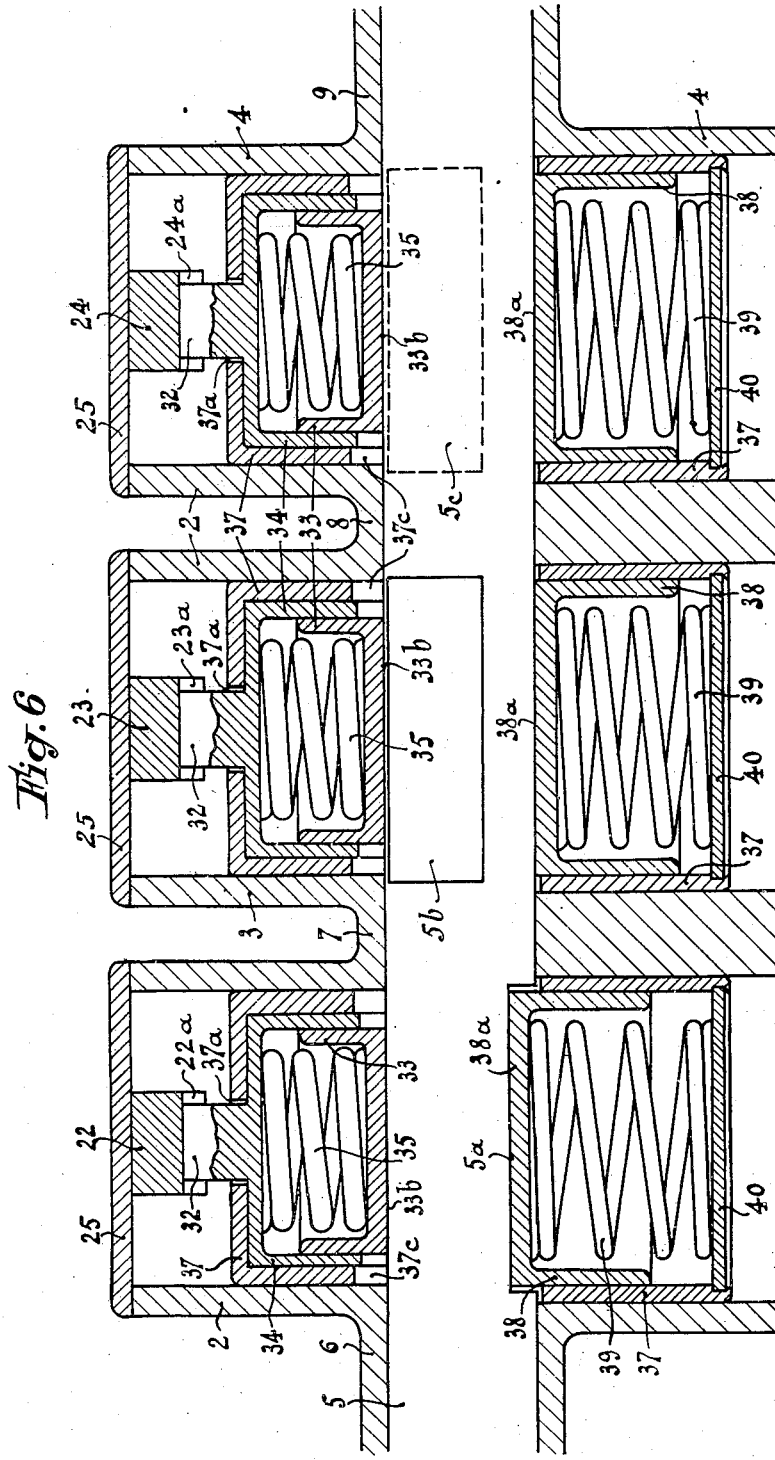

Patented Oct. 18, 1949

2,485,034

UNITED STATES PATENT OFFICE 2,485,034

PRESELECTING MECHANISM FOR
GEAR BOXES

Ettore Bugatti, Paris, France

Application December 27, 1945, Serial No. 637,318
In France April 7, 1944

7 Claims. (Cl. 74—335)

Gear-boxes with planet-gear trains are very frequently provided with devices, interposed in the controls, for pre-selecting speeds, i. e., gears; the pre-selecting manoeuvre consists for instance in placing a handle in a predetermined position.

The change of gear actually takes place afterwards when a pedal is depressed, whatever be the speed to be obtained. The pedal actuation may follow the preliminary manoeuvre immediately or be postponed if need be, the gear remaining engaged until the pedal is depressed.

It is an object of my invention to provide an improved pre-selecting mechanism which is suitable—particularly for gear-boxes having planet-gear trains, but which is not restricted to this particular instance.

According to this invention, I provide a pre-selecting mechanism which comprises firstly slidable control rods or bars permanently biassed to operative position and held by catches or the like in inoperative position, secondly means for cocking or uncocking the catches or the like, adapted to uncock one catch at a time, and thirdly means for operating the rods or bars adapted to cause each rod or bar to be held by or free from its catch according as the latter is cocked or uncocked, the rod or bar being rendered operative when free from its catch to actuate the corresponding control.

Some rods or bars may, in particular, be arranged to control those brakes which in gear-boxes having planet-gear trains, separately lock the various trains, thereby enabling of obtaining the range of intermediate gears (including the gear for reversing) while another rod or bar controls the clutch wherethrough the drive is transmitted in top gear, with such gear-boxes.

The rods or bars, the number of which is equal to the number of gears (including the reversing gear or gears and direct drive) may be arranged in parallel relationship to slide through a casing in which those rods or bars which should remain in inoperative condition are automatically locked by corresponding catches.

The cocking and uncocking means are preferably constructed as follows: to each catch or the like corresponds a control cam which actuates said catch through resilient members so that according to the position of the cam, the catch is resiliently urged to locking position or unlocking position, and the various cams are set with a suitable angular shift on a common shaft.

The rods or bars are preferably permanently urged by strong springs which in operative position supply the necessary force either to apply brakes or to impose a proper pressure on the direct drive multi-disc clutch.

The means for operating the rods or bars preferably comprise a shaft for instance actuated by a pedal, acting on levers, one for each rod or bar, through one-way transmitting means, in order that the rod or bar control movement can take place only against the permanent bias imposed on said bars or rods, i. e., in particular, against the stress from the above mentioned springs.

Owing to the foregoing arrangement, those levers which correspond to rods or bars in locked position are not influenced when depressing the pedal.

As the cam shaft rotates, it brings the various catches successively to unlocking position according to the desired, predetermined sequence. When the pedal is depressed with a more or less great time lag, that rod or bar which corresponds to the pre-selected gear is disengaged, while the precedingly operative rod or bar becomes locked. Hence only one rod or bar can be in operative position at a time.

In some instances, it is useful to provide intermediate or neutral positions; this is obtained by placing the cam shaft in such a position that none of the cams stands opposite a catch and thus no rod or bar is disengaged. The rod or bar which has been in operative position shall then be locked by actuating the pedal as is done for any change of gear.

The mechanism in accordance with this invention may be applied to any gear-boxes having planet-gear trains, and even to gear-boxes with sliding or throw-over gears. It may be used on automobile or railway vehicles, the driving of which is thereby much easier. It is possible without any difficulty to extend its application for instance to machine tool gear-boxes, table or carriage feed boxes, gear-boxes for quick return of carriages and so on.

The following description with reference to the appended drawing given solely by way of example will show how my invention may be carried out.

Figure 3:
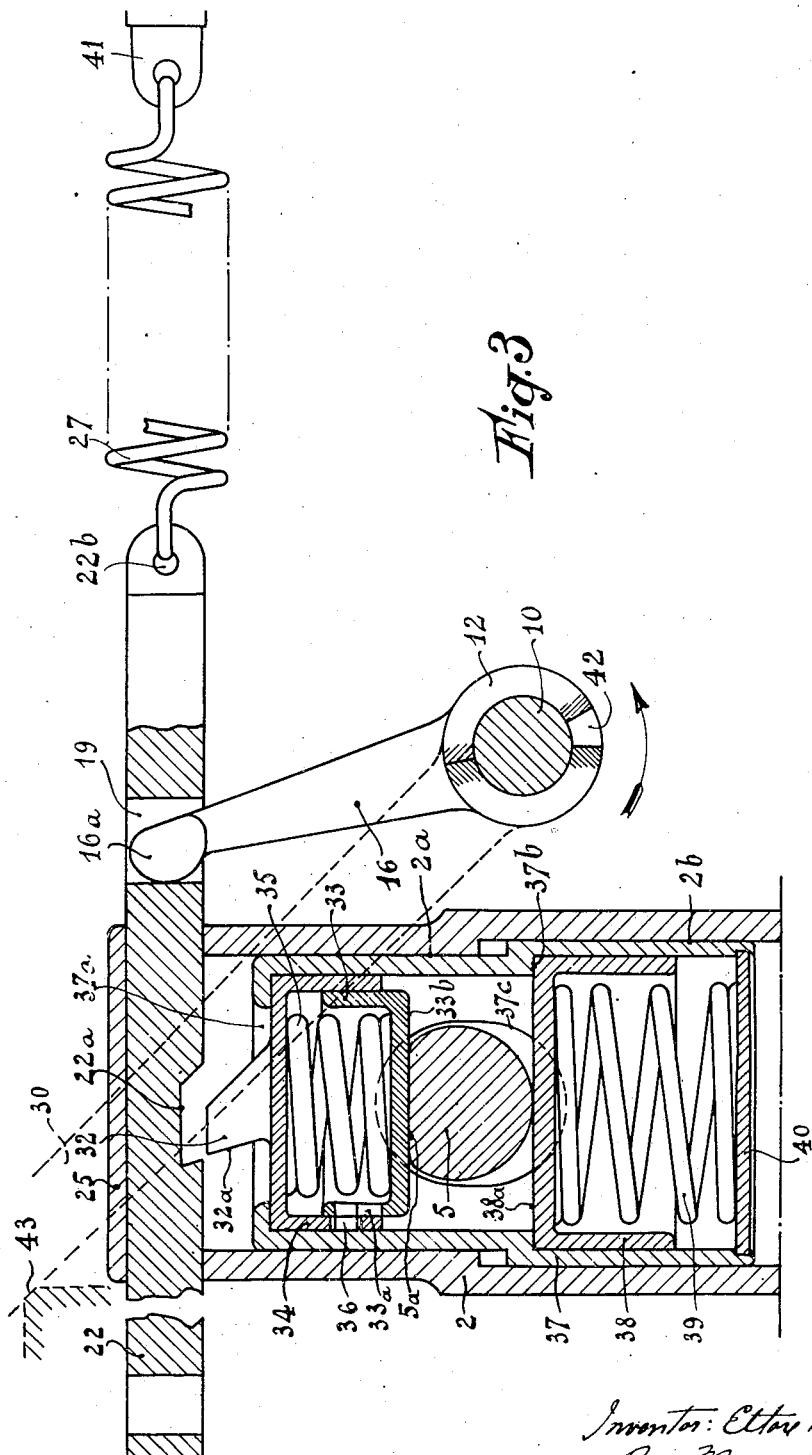

Fig. 3 likewise shows the same rod in unlocked position.

Figure 4:
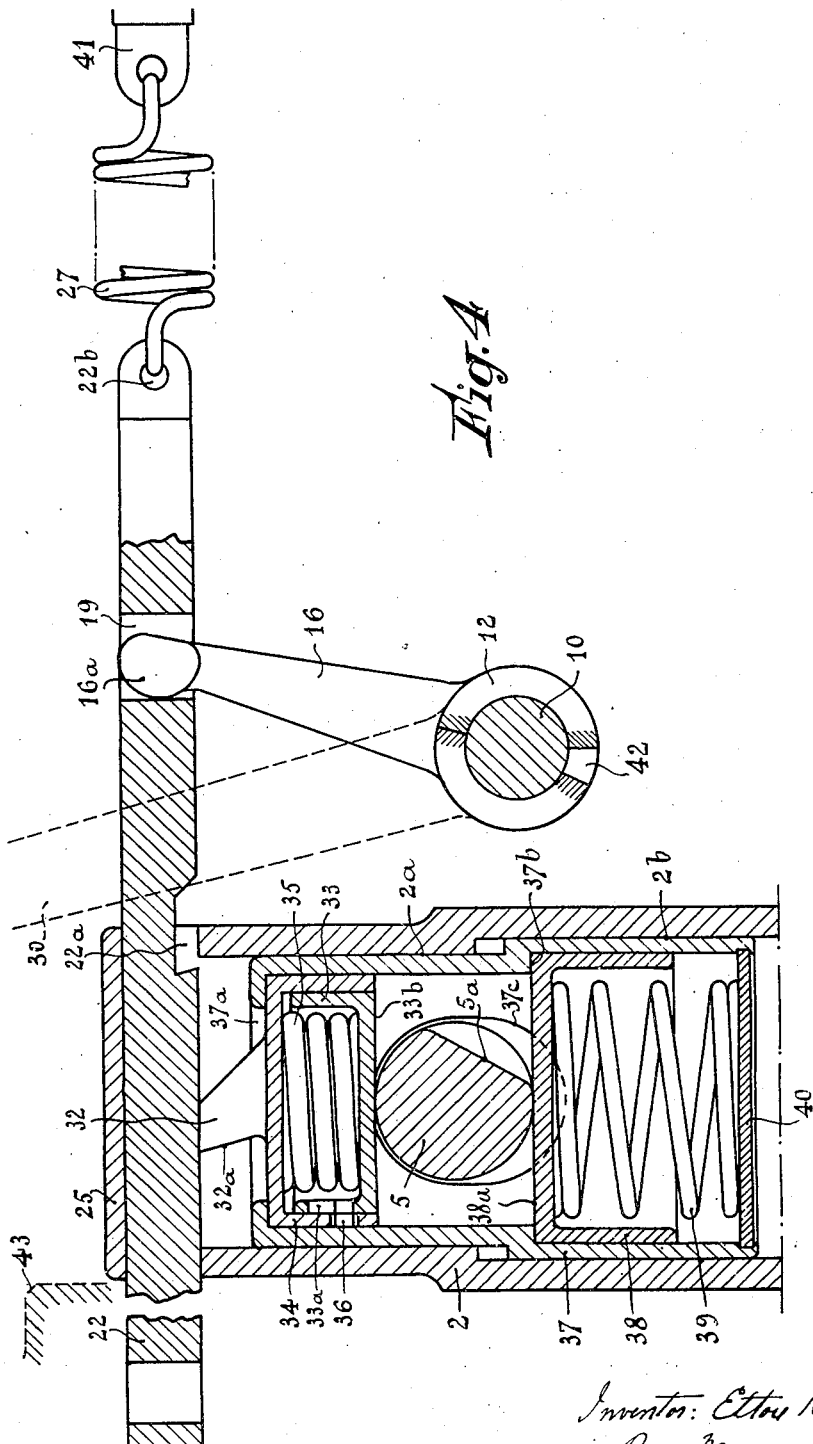

Fig. 4 shows the rod in operative position.

Figure 5:
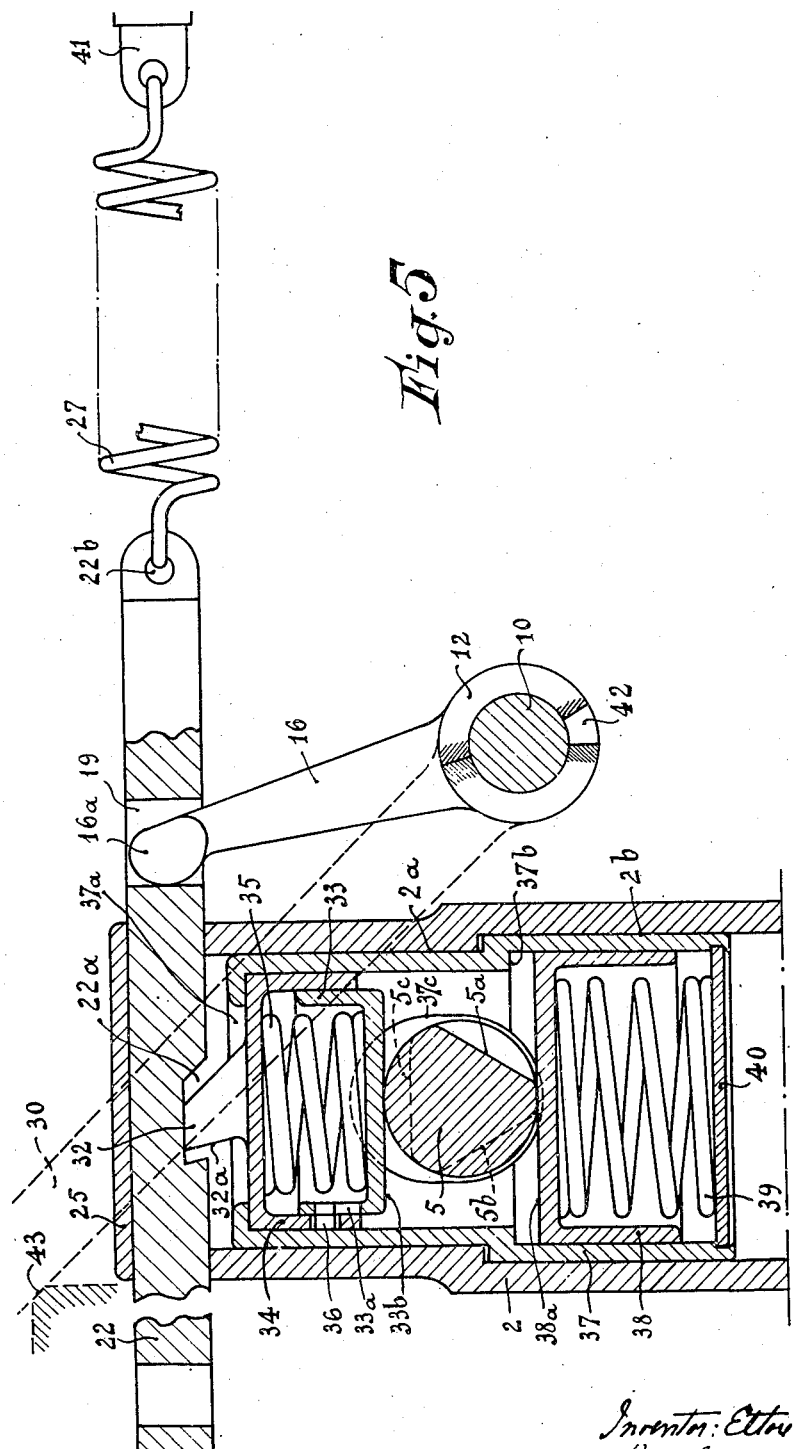

Fig. 5 shows it when being restored to locked position.

Figure 1:
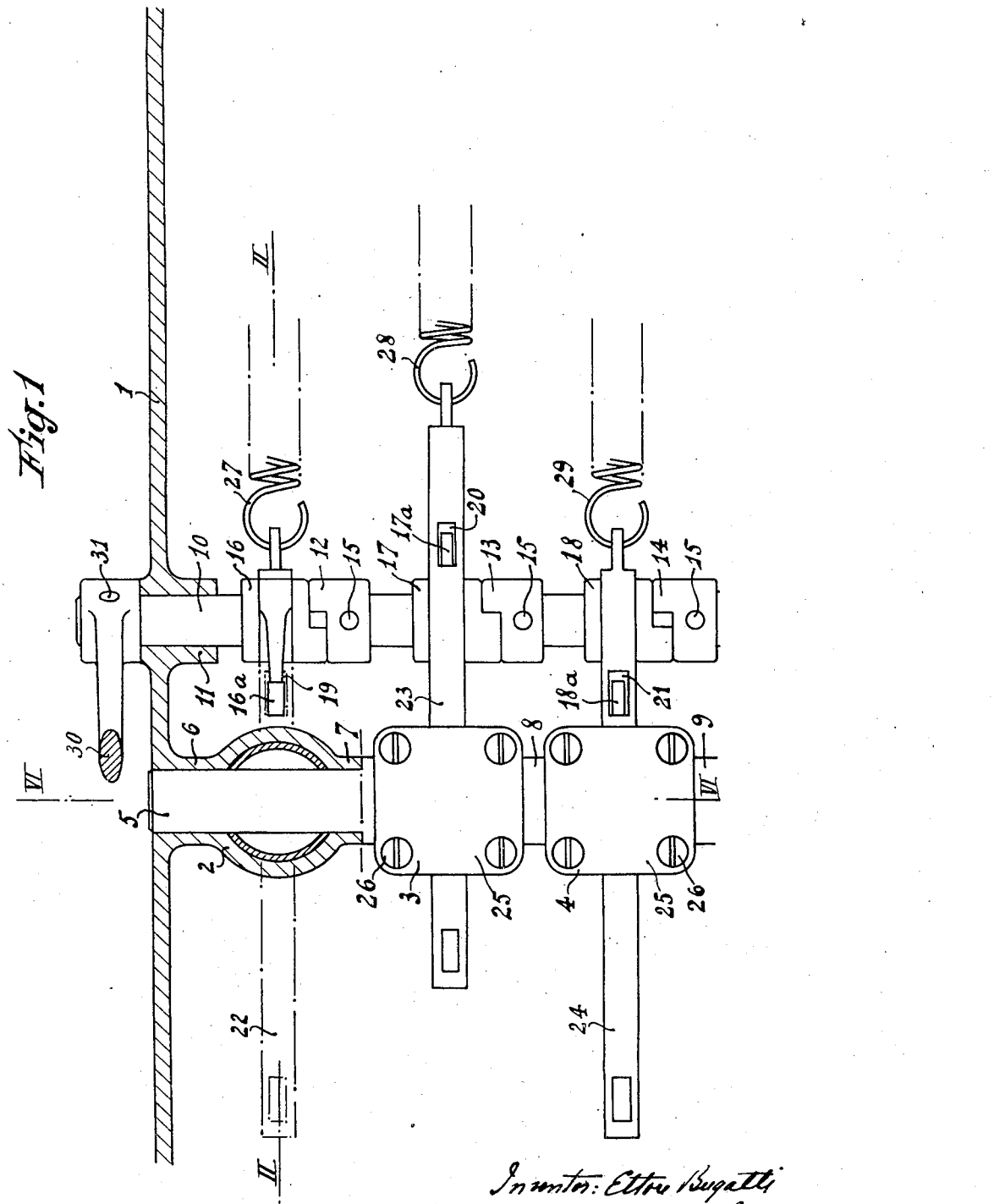
Fig. 1 is a diagrammatic plan view with parts broken away showing an embodiment of a mechanism in accordance with this invention.

Fig. 6 is a cross section along line VI—VI on Fig. 1 showing all rods in locked position, i. e. the mechanisms in neutral position.

The casing or frame 1 of the gear box which in this example is assumed to comprise three gears (one of which may be a reversing gear) is provided with three hollow bosses 2, 3 and 4, one of which 2 is shown in cross section through a horizontal plane comprising the axis of a rotatable member 5 having its periphery locally sunken at axially spaced-apart points such as 5a; said rotatable member will be termed cam shaft 5 for convenience.

Cam shaft 5 revolves in bearings 6, 7, 8 and 9 integral with bosses 2, 3 and 4 or with casing 1. Cam shaft 5 is actuated from a control ending either outside the gear box, or on the dashboard or the vehicle steering pillar or again on a suitable table where the device is incorporated in a machine tool. The control is mentioned only by way of illustration as its construction is wholly independent from that of the device in accordance with this invention.

Arranged in parallel relationship with cam shaft 5 and revolving in bearings such as 11, integral with casing 1, is a second shaft 10. Driving lugs 12, 13, 14 are secured on shaft 10 by means of transfixing pins 15 or any other means.

Loosely carried on shaft 10 are levers 16, 17 and 18 adapted to be carried round by lugs 12, 13 and 14 respectively. The upper ends 16a, 17a and 18a of levers 16, 17 and 18 engage holes 19, 20 and 21 in control members or rods 22, 23 and 24 which slide through hollow bosses 2, 3 and 4 in a plane above that of cam shaft 5.

Covers or lids 25 secured by screws 26 guide rods 22, 23 and 24 together with apertures or notches provided in the walls of hollow bosses 2, 3 and 4. The left ends of rods 22, 23 and 24 are adapted for connection with devices for controlling the operation of brake bands corresponding to the various planet gear trains. One of said rods, for instance the middle rod 23, actuates a control for a multi-disc clutch adapted to couple the driving shaft with the driven shaft and thus provides for direct drive. Such controls are well known and need not be further described.

The right ends of rods 22, 23 and 24 are adapted for hooking thereto springs 27, 28 and 29 which permanently draw said rods and supply the necessary force for applying the brakes or engaging the clutch discs, so that the springs are in effect means biassing control members or rods 22—24 to operative position. Springs 27, 28 and 29 are also attached to stationary points, for instance to a wall of casing 1.

A pedal 30 is pinned at 31 on shaft 10; it allows of effecting all speed change manoeuvres or putting the mechanism in neutral position, and when placed on automobile vehicles, it occupies the same position as the conventional pedal for disengaging the clutch. In industrial uses, a hand lever if it is more convenient may obviously be substituted for pedal 30.

Rods 22 and 24 are locked while rod 23 is in operative position.

I shall now proceed with a description of the operation of the mechanism with its various steps, reference being had to Figs. 2, 3, 4 and 5 which are longitudinal sections along the axis of rod 22 taken as an example. The motions of the other rods 23 and 24 are the same but they take place successively as cam shaft 5 has been rotated by one third or two-thirds of a round.

Rod 22 (Fig. 2) is retained by a catch or pawl 32 which is retained in recess 22a by its oblique face 32a by reason of the pull exerted by spring 27 attached at 22b to rod 22.

Cam shaft 5 is in such a position that a flat portion thereon 5a is at right angles to the axis of hollow boss 2 and faces upwardly. In this position, between the bottom 33b of an inner sleeve 33 and the flat portion 5a, there is a clearance at least equal to the height or depth of recess 22a in rod 22.

Sleeve 33 is guided in a skirt 34 integral with the base of catch 32, in which it is adapted to slide while compressing a coil spring 35. The sliding movement is limited by one or more pins 36 screwed in the skirt 34 of catch 32 and providing abutments for the ends of one or more slots 33a in sleeve 33, in order that spring 35 is still slightly compressed while it is fully extended.

A sleeve 37 is guided in bores 2a and 2b of hollow boss 2; said sleeve provides a guide for skirt 34 of catch 32 and also for an inner sleeve 38, the upper face of which 38a is backed by cam shaft 5, the sleeve 38 pushing sleeve 37 downwardly through a coil spring 39. As the latter is compressed, it would cause sleeve 37 and catch 32 to move down unless the latter were retained by its slanting face 32a and the action of spring 27 attached at 41 to a wall of casing 1.

The sleeve 37 is also adapted to prevent the catch 32 from turning about the axis of its skirt 34. For this purpose, a rectangular aperture 37a, having a width suited to the thickness of catch 32 is provided in the top face of sleeve 37.

Said sleeve 37 is itself steered by the cam shaft 5 which passes therethrough. To this end, sleeve 37 has elongated apertures 37c, which allow of cam shaft 5 to pass therethrough with a small clearance. The apertures are obviously shaped in order that the vertical stroke of sleeve 37 be kept into account.

Spring 39 is selected weaker than spring 35 and is retained by a plate 40 set in the lower part of sleeve 37. The sleeve 38 abuts on a shoulder 37b of sleeve 37 and limits extension of spring 39.

Pedal 30 is shown in rest position but as the flat portion 5a on cam-shaft 5 faces the catch 32, the gear selected in the gear box corresponds to rod 22 and the mechanism is prepared for gear change manoeuvre. It should be understood that one of the other rods, for instance 23, is released from its catch and will be locked by depressing the pedal as hereinafter described with reference to Fig. 3.

Pedal 30 when depressed (Fig. 3) moves lug 12 fast with shaft 10. As lug 12 turns according to arrows on Figs. 2 and 3, it makes up for clearance 42 (shown at the top on Fig. 2) between said lug and the hub of lever 16. Lug 12 then pushes lever 16 leftwards or in anticlockwise direction and lever 16 drives rod 22 through its end 16a engaging hole 19 in said rod until pedal 30 abuts on stationary abutment 43. Abutment 43 is so located that lever 16 slightly overtakes the position it occupies on Fig. 2; said position is also that of all other levers such as 18, the rod 24 corresponding to which is locked.

Figure 2:
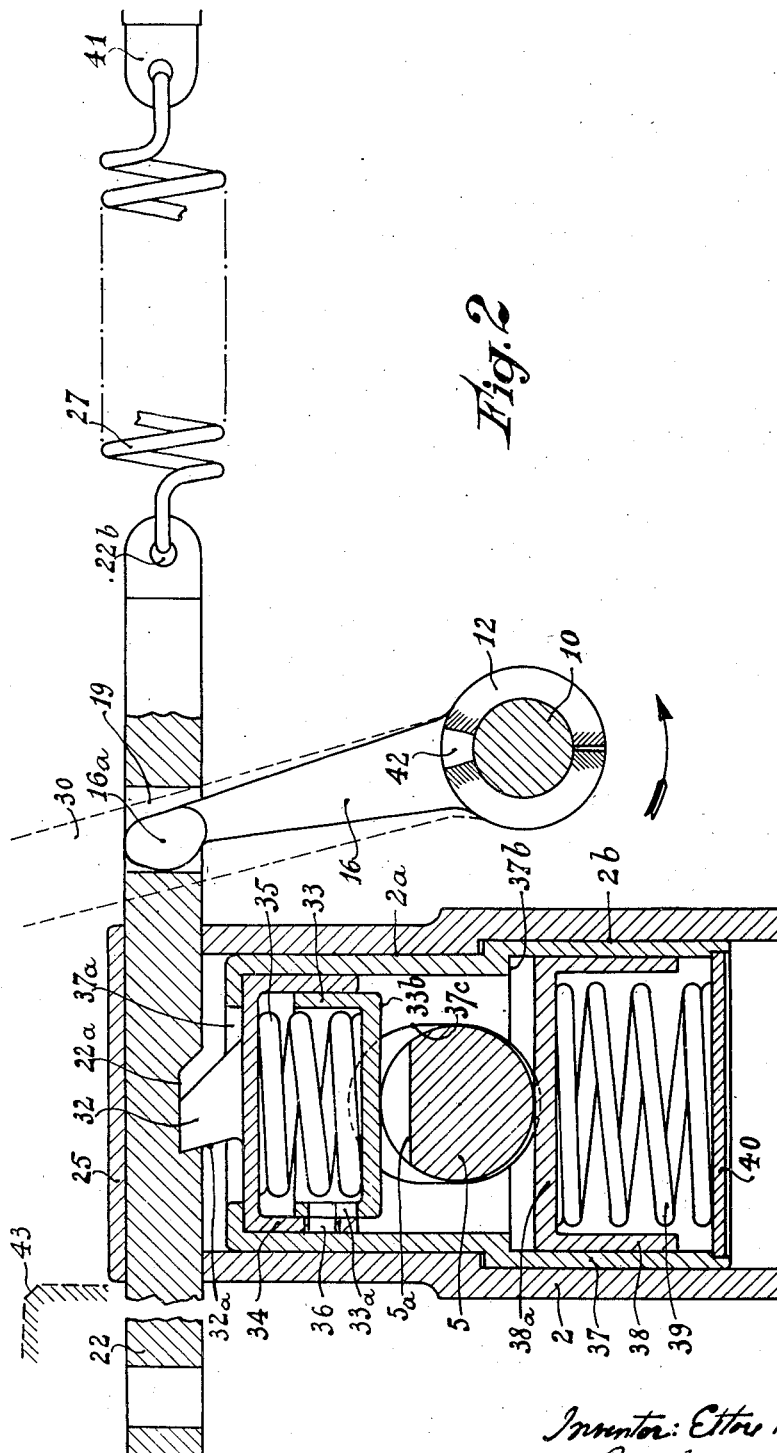
Fig. 2 is a longitudinal section taken along line II—II on Fig. 1 and showing one of the bars in locked position.

As pedal 30 strikes abutment 43, the rod 22, having overtaken the position shown on Fig. 2, the catch 32, the sleeve 33 and the spring 35 urged by sleeve 37 which is itself urged by lower spring 39, fall on the flat portion 5a on cam shaft 5, thus releasing rod 22.

In this position, spring 27 which draws rod 22 tends to move pedal 30 rightwards or in clockwise direction through lug 12 and lever 16 which are interengaged.

When pedal 30 is no longer depressed, it is thus restored to the position shown on Fig. 2, and lever 16 assumes a new position as shown on Fig. 4. Spring 27 then acts without any hindrance on the brake of the corresponding gear train through rod 22 which slides in the apertures or notches in hollow boss 2 and lid 25.

Should it be desired again to throw in another gear, cam shaft 5 is rotated through the pre-selecting control, for instance by 120°, so as to bring the flat portion 5a into the position shown on Fig. 4. By reason of said manoeuvre, catch 32 is "cocked," i. e. is retained only by the lower face of rod 22. As a matter of fact, spring 35 is compressed between cam shaft 5, the bottom 33b of sleeve 33 on the one hand, the catch 32 and the lower face of rod 22 on the other hand.

On the contrary, spring 39 is extended to its greater length as spring 35, fully compressed allows of sleeve 37 and plate 40 to move down to their lowermost positions. Hence, spring 39 can in no way interfere with the action of spring 35 which freely expands as soon as pedal 30 is moved to contact stationary abutment 43 (Fig. 5).

Catch 32 again springs into recess 22a in rod 22. Should pedal 30 be released, rod 22 slides rightwards under influence of spring 27 until the slanting face 32a of catch 32 prevents further sliding.

Lever 16 remains in its position whereas lug 12 carried with shaft 10, itself fast with pedal 30, turns in clockwise direction so that clearance 42 is shifted from the bottom to the top.

In its being actuated, pedal 30 has of course released the rod which corresponds to that flat portion on cam shaft 5 which lies upward (for instance flat portion 5c and rod 24). The flat portion 5a is still in the position of Fig. 4 while the flat portion 5b corresponding to rod 23 which is also locked occupies a symmetrical position. The flat portion 5c corresponding to rod 24 which is released, faces as above mentioned, towards the bottom 33b of sleeve 33, i. e. upwards.

In all applications, it is necessary that the change speed device can be brought to neutral position, that is, to have no gear in operation. This is easy with the mechanism above described. It is only necessary to bring cam-shaft 5 to such a position that none of the flat portions 5a, 5b and 5c faces upwards (Fig. 6).

By moving pedal 30 in anticlockwise direction that one of rods 22, 23, 24 which is in operative position is brought back and hooked to its catch. Pedal 30 will unhook none of the other rods as none of the flat portions 5a, 5b and 5c allows of catches such as 32 to fall. The brakes acting to render the various trains inoperative thus remain free as well as the clutch for direct drive which is in disengaged position. Consequently, the driving shaft does not actuate the driven shaft.

Referring to Fig. 6 illustrating one of the neutral positions, it will be seen that as the flat portion 5a is directed downwardly, the spring 39 has its maximum length, this being immaterial since said spring 39 still is slightly compressed in this position.

As the other flat portions 5b and 5c are symmetrically located on either side of the vertical axis of the mechanism, the corresponding lower springs such as 39 stand in positions analogous to that of Figs. 2 and 5.

In order to pass from the neutral position to any one of the in-gear positions, it is only necessary to bring cam-shaft 5 to the required position and to move pedal 30 towards its abutment 43; the pedal will move back as the corresponding rod is disengaged.

As many neutral positions as the number of intermediate positions for cam-shaft 5 will be provided, i. e. three in the present instance. In actual practice, only one or two of said neutral positions need be kept. To this end, the sector or dial before which the control lever for cam shaft 5 is moved, may be constructed to show only those positions which it is required to obtain, to wit three speeds and a neutral position or three speeds and two neutral positions. It is thus avoided to move the lever round a complete turn.

The various positions may be defined positively by notches co-operating with a movable finger attached to the lever or any other means serving the same purpose.

A pre-selecting mechanism as above described is applicable to three speed gear-box, for instance with two gears for forward running, including a direct drive, and a reversing gear. The cam shaft in this instance comprises three flat portions delineating an equilateral triangle in cross-section.

More generally, for N speeds or gears, N flat portions are required on the cam-shaft. The foregoing explanations in connection with the neutral position wherein one of the flat portions faces downwards (Fig. 6), are also true for any odd number of speeds or gears.

Where N is an even number (the number two being included), one of the flat portions faces downwards when the symmetrical flat portion faces upwards, so that any one of springs like spring 39 is released whatever be the gear in operation. On the contrary, as concerns neutral positions, reference will be had to the right-end and middle portions of Fig. 6, as all like portions in the whole mechanism will be in the same position.

From the foregoing description, it will be understood that for example sleeve 37 is a slidable member which is guided in portion 2 of the frame or casing and is downwardly biassed by spring 39 backed on the periphery of rotatable member or cam shaft 5, while skirt 34 integral with catch 32 is a second slidable member movably guided in the first slidable member or sleeve 37 and urged upwardly by spring 35 stronger than spring 39, the upward movement of skirt 34 and catch 32 being limited by engagement of the top surface thereof with the inwardly projecting top flange of the first slidable member or sleeve 37.

In view of the foregoing explanations, it will further be understood that pedal 30, lugs 12—14, shaft 10 and levers 16—18 provide one-way means whereby the various control members or levers 22—24 may be moved together away from their operative positions, when pedal 30 is turned in counterclockwise direction, while rotation in clockwise direction does not move said levers. Likewise, catches 32 are a plurality of movable locking members, each of which in operative position (Fig. 2) retains the corresponding lever or control member such as 22 in inoperative position; and the combination of rotatable member or cam shaft 5 (with its angularly and axially spaced apart sunken portions 5a, 5b, 5c), springs 35, 39 and slidable members 34, 37 provide selective cocking means to urge all catches to operative position except that catch such as 32 (Fig. 3) opposite which lies a sunken portion (5a) of cam shaft 5.

Finally it will also be realized that each portion of cam shaft 5 which has a sunken part such as 5a amounts to a camming portion to which correspond shaft contacting members such as 33a and 33b.

What I claim is:

1. In a pre-selecting mechanism of the type described, the combination of a frame; a control member biassed to operative position, slidably guided and supported in said frame; a catch slidably guided and supported from said frame, for movement to and away from the control member, the catch and the control member having cooperative parts so adapted and arranged that the control member is retained in an inoperative position by said catch when said parts are interengaged; means backed from said frame for biassing said catch to inoperative position; and means including a resilient member for moving said catch to operative position.

2. In a pre-selecting mechanism of the type described, the combination of a frame; a rotatable member having a locally sunken periphery revolubly borne in said frame; a first slidable member movably guided in said frame; resilient means backed on the periphery of said rotatable member for biassing the first slidable member in one direction; a second slidable member movably guided in the first slidable member; resilient means stronger than the first named resilient means, backed on the periphery of said rotatable member for biassing the second slidable member in a direction opposite to the first named one; cooperable means on the first and second slidable members for limiting the relative movement of said second slidable member with respect to the first slidable member in said opposite direction; and a movable control member biassed to operative position slidably supported in said frame for movement in crosswise direction with respect to the slidable members, the second slidable member and the control member having parts adapted and arranged for interengagement, operative to hold said control member from said second slidable member in an inoperative position.

3. In a pre-selecting mechanism of the type described, the combination of a frame; a movable control member biassed to operative position, slidably guided and supported in said frame; a catch slidably guided in said frame for movement in a direction at a predetermined angle with the direction of movement of the control member, the control member and the catch having interengaging parts so adapted and arranged as to be interlocked mutually when the catch is in operative position and the control member in inoperative position; means backed from said frame for biassing said catch to inoperative position; and means including a resilient member for moving said catch to operative position.

4. In a pre-selecting mechanism, the combination of a frame; a plurality of movable control members, each of which is biassed to operative position and is slidably guided and supported in said frame; one-way means for moving said control members together away from their operative position; a plurality of movable locking members, movably supported from the frame, each of which is associated with one of said control members, is resiliently biassed to inoperative position, and is adapted, in operative position, to retain said control member in inoperative position and to be retained by the same in said operative position; and selective cocking means for resiliently urging to operative position all locking members together but any one of them at will, against the resilient bias thereof.

5. In a pre-selecting mechanism of the type described, the combination of a frame; $n$ movable control members, each of which is resiliently biassed to operative position, is movably supported from said frame and is adapted to assume, besides said operative position, a predetermined inoperative position and a further position farther from the operative position than the predetermined inoperative position; $n$ movable locking members, each of which is movably supported from said frame, is associated with one of said control members and operative to retain it in said predetermined inoperative position and to be retained by the same in operative position; adjustable means for resiliently urging any group of $n-1$ of said locking members to operative position; means weaker than the last named means for resiliently urging all locking members together to inoperative position; and one-way means for moving the control members together away from operative position to said further position through said predetermined inoperative position; $n$ being an integer greater than 1.

6. In a pre-selecting mechanism of the type described, the combination of a frame including a plurality of parallel, separate guides; a shaft extending in cross direction with respect to said guides and rotatably borne in said frame, said shaft having spaced-apart camming portions which have the same mutual spacing along the shaft as the guides and are angularly set off; a locking member slidably held from each guide; and a plurality means including a pair of shaft contacting members resiliently urged in opposite directions to be pressed on said shaft on either side thereof, each positioned to engage one of said camming portions, for controlling the position of the corresponding locking member in its guide in dependence on the angular position of said shaft.

7. The combination of claim 6, the shaft having $n$ camming portions which are angularly spaced apart, according to a predetermined sequence, by an amount substantially equal to $$\frac{360°}{n}$$

ETTORE BUGATTI.

REFERENCES CITED

The following references are of record in the file of this patent:

UNITED STATES PATENTS

| Number | Name | Date |
|---|---|---|
| 2,205,844 | Clements | June 25, 1940 |
| 2,223,406 | Chisholm | Dec. 3, 1940 |
| 2,276,258 | Horowitz | Mar. 10, 1942 |
| 2,388,043 | Derungs | Oct. 30, 1945 |